(12) United States Patent
Imada

(10) Patent No.: US 11,352,493 B2
(45) Date of Patent: Jun. 7, 2022

(54) RESIN COMPOSITION AND RESIN MOLDED ARTICLE

(71) Applicant: FUJIFILM BUSINESS INNOVATION CORP., Tokyo (JP)

(72) Inventor: Akira Imada, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/941,625

(22) Filed: Jul. 29, 2020

(65) Prior Publication Data

US 2021/0301128 A1    Sep. 30, 2021

(30) Foreign Application Priority Data

Mar. 25, 2020   (JP) .............................. JP2020-055089

(51) Int. Cl.
```
C08L 69/00      (2006.01)
B29C 45/00      (2006.01)
C08G 63/183     (2006.01)
C08K 5/00       (2006.01)
C08K 5/521      (2006.01)
C08L 27/18      (2006.01)
```
(52) U.S. Cl.
CPC .......... *C08L 69/00* (2013.01); *B29C 45/0001* (2013.01); *C08G 63/183* (2013.01); *C08K 5/0066* (2013.01); *C08K 5/521* (2013.01); *C08L 27/18* (2013.01); *C08L 2205/18* (2013.01); *C08L 2205/22* (2013.01)

(58) Field of Classification Search
USPC ..... 528/196, 198, 271, 272, 274; 428/411.1, 428/412
See application file for complete search history.

(56) References Cited

U.S. PATENT DOCUMENTS

| | | | |
|---|---|---|---|
| 9,916,939 B1 * | 3/2018 | Rout | .................. H01H 71/0207 |
| 10,100,194 B2 * | 10/2018 | Imada | ..................... C08L 67/02 |
| 2016/0185957 A1 | 6/2016 | Imada | |
| 2017/0247538 A1 | 8/2017 | Imada | |
| 2017/0369701 A1 | 12/2017 | Imada | |

FOREIGN PATENT DOCUMENTS

| | | | |
|---|---|---|---|
| JP | 6123787 | B2 | 5/2017 |
| JP | 2017-149870 | A | 8/2017 |
| JP | 2018-002996 | A | 1/2018 |

\* cited by examiner

*Primary Examiner* — Terressa Boykin
(74) *Attorney, Agent, or Firm* — Oliff PLC

(57) ABSTRACT

A resin composition includes a polycarbonate-based resin and a polyethylene terephthalate resin, and the resin composition has a resin phase-separated structure including a continuous phase containing the polycarbonate-based resin and a dispersed phase containing the polyethylene terephthalate resin, in which a number average diameter in a longitudinal direction of the dispersed phase is 1.5 μm or less, a number average diameter in a lateral direction of the dispersed phase is 0.8 μm or less, and an aspect ratio of the number average diameter in the longitudinal direction to the number average diameter in the lateral direction is 2.5 or less.

19 Claims, No Drawings

RESIN COMPOSITION AND RESIN MOLDED ARTICLE

CROSS-REFERENCE TO RELATED APPLICATIONS

This application is based on and claims a priority under 35 USC 119 from Japanese Patent Application No. 2020-055089 filed on Mar. 25, 2020.

BACKGROUND

Technical Field

The present invention relates to a resin composition and a resin molded article.

Related Art

In the related art, a resin composition has been used for various purposes. For example, the resin composition is used, as a resin molded article containing the resin composition, in various parts of home electric appliances and automobiles, housings for office equipment and electronic/electrical equipment, and the like.

Among the resin compositions, a resin composition containing a polycarbonate-based resin is used for parts and the like in the fields of machines, automobiles, electricity, or electronics, because the polycarbonate-based resin is a thermoplastic resin excellent in impact resistance, heat resistance, or the like. Further, a resin composition containing a polyethylene terephthalate resin is known to exhibit good molding flowability.

For example, Patent Literature 1 discloses "a resin composition containing a polycarbonate-based resin, a polyethylene terephthalate resin, a glycidyl group-containing polyethylene-based copolymer, an organic phosphorus flame retardant, and a flame retardant anti-dripping agent, in which the content of the polycarbonate-based resin is 60 mass % or more and 90 mass % or less and the content of the polyethylene terephthalate resin is 10 mass % or more and 40 mass % or less based on a total amount of the polycarbonate-based resin and the polyethylene terephthalate resin, and the glycidyl group-containing polyethylene-based copolymer is a polyethylene-based copolymer composed of a glycidyl group-containing (meth)acrylate unit and an ethylene unit, or a copolymer obtained by graft-polymerizing a polymerizable vinyl monomer to the main chain of the polyethylene-based copolymer".

For example, Patent Literature 2 discloses "a resin composition containing a polycarbonate-based resin, a reaction product of a glycidyl group-containing polyethylene-based copolymer and a polyethylene terephthalate resin, the polyethylene terephthalate resin unreacted with the glycidyl group-containing polyethylene-based copolymer, an organic phosphorus flame retardant, and a flame retardant anti-dripping agent, in which the polyethylene terephthalate resin in the reaction product is 3 mass % or more based on the total amount of the reaction product".

For example, Patent Literature 3 discloses "a resin composition containing a polycarbonate-based resin, a reaction product of a glycidyl group-containing polyethylene-based copolymer and a polyethylene terephthalate resin, the polyethylene terephthalate resin unreacted with the glycidyl group-containing polyethylene-based copolymer, an organic phosphorus flame retardant, and a flame retardant anti-dripping agent, in which in a resin phase-separated structure observed with an electron microscope, the polycarbonate-based resin and the unreacted polyethylene terephthalate resin are continuous phases, the reaction product is a dispersed phase, and the specific surface area of the dispersed phase is 2 or more".

CITATION LIST

Patent Literature

Patent Literature 1: Japanese Patent No. 6123787
Patent Literature 2: JP-A-2017-149870
Patent Literature 3: JP-A-2018-002996

SUMMARY

Aspects of non-limiting embodiments of the present disclosure related to a resin composition which contains a polycarbonate-based resin and a polyethylene terephthalate resin, and has a resin phase-separated structure including a continuous phase containing the polycarbonate-based resin and the dispersed phase containing a polyethylene terephthalate resin, and in which a variation in measurement during injection molding is prevented as compared with a case where a number average diameter in a longitudinal direction of the dispersed phase is more than 1.5 μm or a case where an aspect ratio of the number average diameter in the longitudinal direction to the number average diameter in a lateral direction is more than 2.5.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin composition, containing:
a polycarbonate-based resin; and
a polyethylene terephthalate resin, and the resin composition having
a resin phase-separated structure including a continuous phase containing the polycarbonate-based resin and a dispersed phase containing the polyethylene terephthalate resin, wherein
a number average diameter in a longitudinal direction of the dispersed phase is 1.5 μm or less,
a number average diameter in a lateral direction of the dispersed phase is 0.8 μm or less, and
an aspect ratio of the number average diameter in the longitudinal direction to the number average diameter in the lateral direction is 2.5 or less.

DETAILED DESCRIPTION

An exemplary embodiment of the present invention will be described below. These descriptions and Examples illustrate the exemplary embodiment, and do not limit the scope of the exemplary embodiment.

In the numerical ranges described in stages in this description, an upper limit or a lower limit described in one numerical range may be replaced with an upper limit or a lower limit of the other numerical range described in stage. Further, in the numerical ranges described in this disclosure, the upper limit or the lower limit of the numerical range may be replaced with values shown in Examples.

In the present description, each component may include a plurality of corresponding substances.

In the present description, in a case of referring to the amount of each component in the composition, when there are a plurality of substances corresponding to each component in the composition, unless otherwise specified, it refers to the total amount of the plurality of substances present in the composition.

The development of a resin molded article containing a resin composition containing a polyethylene terephthalate resin, which is aimed for reuse, and a polycarbonate-based resin having chemical resistance, is proceeding. However, the resin composition containing a polycarbonate-based resin and a polyethylene terephthalate resin in the related art tends to cause a variation in measurement during injection molding. Although the reason is not necessarily clear, it may be estimated as follows.

The polyethylene terephthalate resin is generally a resin having crystallinity. Therefore, when the resin composition containing the polyethylene terephthalate resin is heated to near a melting point of the polyethylene terephthalate resin, the viscosity extremely changes, and a variation tends to occur in the resin composition in measurement during the injection molding. When the variation occurs in measurement of the resin composition during the injection molding, the volume of the resin discharged from each molding shot tends to vary. As a result, the weight and dimension of the resin molded article may vary.

The resin composition according to the present exemplary embodiment contains a polycarbonate-based resin and a polyethylene terephthalate resin, and has a resin phase-separated structure including a continuous phase containing the polycarbonate-based resin and a dispersed phase containing the polyethylene terephthalate resin, in which a number average diameter in the longitudinal direction of the dispersed phase is 1.5 µm or less, a number average diameter in the lateral direction of the dispersed phase is 0.8 µm or less, and an aspect ratio of the number average diameter in the longitudinal direction to the number average diameter in the lateral direction is 2.5 or less.

In the resin composition according to the present exemplary embodiment, the variation in measurement during the injection molding may be prevented. The reasons are not necessarily clear, but may be estimated as follows.

The resin composition according to the present exemplary embodiment has a resin phase-separated structure including a continuous phase containing a polycarbonate-based resin and a dispersed phase containing a polyethylene terephthalate resin. A number average diameter in the longitudinal direction of the dispersed phase is 1.5 µm or less, a number average diameter in the lateral direction of the dispersed phase is 0.8 µm or less, and an aspect ratio of the number average diameter in the longitudinal direction to the number average diameter in the lateral direction is 2.5 or less. That is, the resin composition according to the present exemplary embodiment has a small size of the dispersed phase containing the polyethylene terephthalate resin and has a shape close to a sphere. Therefore, since the volume of the dispersed phase containing the polyethylene terephthalate resin in contact with the continuous phase containing the polycarbonate-based resin is kept small, the influence of the viscosity change of the polyethylene terephthalate resin on the entire resin composition may be easily prevented to be small. As a result, it is considered that the variation in the measurement of the resin composition during the injection molding may be prevented.

Resin Phase-Separated Structure

The resin composition according to the present exemplary embodiment has a resin phase-separated structure including a continuous phase containing a polycarbonate-based resin and a dispersed phase containing a polyethylene terephthalate resin.

In the resin composition according to the present exemplary embodiment, a number average diameter in the longitudinal direction of the dispersed phase constituting the resin phase-separated structure is 1.5 µm or less, a number average diameter in the lateral direction of the dispersed phase constituting the resin phase-separated structure is 0.8 µm or less, and an aspect ratio of the number average diameter in the longitudinal direction to the number average diameter in the lateral direction is 2.5 or less.

Number Average Diameter in Longitudinal Direction

In the resin composition according to the present exemplary embodiment, the number average diameter in the longitudinal direction of the dispersed phase constituting the resin phase-separated structure is 1.5 µm or less, and is, from the viewpoint of further preventing the variation in measurement during the injection molding, more preferably 0.1 µm or more and 1.4 µm or less, and more preferably 0.5 µm or more and 1.3 µm or less.

Number Average Diameter in Lateral Direction

In the resin composition according to present exemplary embodiment, the number average diameter in the lateral direction of the dispersed phase constituting the resin phase-separated structure is 0.8 µm or less, and is, from the viewpoint of further preventing the variation in measurement during the injection molding, more preferably 0.05 µm or more and 0.7 µm or less, and more preferably 0.1 µm or more and 0.6 µm or less.

Aspect Ratio

In the resin composition according to the present exemplary embodiment, the aspect ratio (=the number average diameter in the longitudinal direction/the number average diameter in the lateral direction) of the number average diameter in the longitudinal direction of the dispersed phase constituting the resin phase-separated structure to the number average diameter in the lateral direction of the dispersed phase constituting the resin phase-separated structure is 2.5 or less, and is, from the viewpoint of further preventing the variation in measurement during the injection molding, more preferably 1 or more and 2.3 or less, and more preferably 1.5 or more and 2.25 or less.

The resin phase-separated structure may be confirmed as follows.

A center portion in the cross-sectional direction of the resin composition or a resin molded article containing the resin composition (for example, an evaluation test piece molded by the method described below) is cut into 1 mm square. The polyethylene terephthalate resin in the resin molded article or the evaluation test piece is dyed with ruthenium tetroxide. Thereafter, the resin molded article or the evaluation test piece is cut by using an ultramicrotome at −196° C. to make an ultrathin section of 0.1 µm or less (about 80 nm), and the ultrathin section is observed with a transmission electron microscope (JEM-2100 manufactured by JEOL Ltd.) under a magnification of 35,000 times. Then, based on the obtained image, the resin phase-separated structure including a continuous phase and a dispersed phase is confirmed.

The number average diameter in the longitudinal direction of the dispersed phase represents an arithmetic mean value of diameters in the longitudinal direction measured for the dispersed phase in the obtained image, for example, observed by image analysis software "Image J" manufactured by National Institutes of Health of USA. The number average diameter in the lateral direction of the dispersed phase represents an arithmetic mean value of diameters in the lateral direction measured for the dispersed phase in the obtained image, for example, observed by the image analysis software "Image J". Then, the aspect ratio of the obtained number average diameter in the longitudinal direction to the obtained number average diameter in the lateral direction is obtained.

The diameter in the longitudinal direction of the dispersed phase represents the longest diameter of the dispersed phase. The diameter in the lateral direction of the dispersed phase represents the longest linear distance connecting one end to the other end of the dispersed phase in the lateral direction, in a direction perpendicular to the diameter in the longitudinal direction.

The methods of setting the number average diameter in the longitudinal direction of the dispersed phase, the number average diameter in the lateral direction of the dispersed phase, and the aspect ratio in the resin phase-separated structure within the above ranges are not particularly limited. Examples thereof include: 1) a method of increasing kneading specific energy (ESP, work amount added per unit weight); 2) a method of adjusting a viscosity of a resin composition by lowering a kneading temperature; 3) a method of adjusting weight average molecular weights of the polyethylene terephthalate resin and the polycarbonate-based resin; and 4) a method of strengthening a kneading zone in a screw configuration of a kneader.

Specific Surface Area A

In the resin phase-separated structure according to the present exemplary embodiment, from the viewpoint of further preventing the variation in measurement during the injection molding, it is preferable that when the value of ½ of the number average diameter $R_{LONG}$ in the longitudinal direction of the dispersed phase is substituted for $r_i$ n the following Equation (A), the value of the specific surface area A represented by the following Equation (A) is 2.0 or more, and when the value of ½ of the number average diameter $R_{SHORT}$ in the lateral direction of the dispersed phase is substituted for $r_i$ in the following Equation (A), the value of the specific surface area A represented by the following Equation (A) is 7.0 or more;

it is more preferable that when the value of ½ of the number average diameter $R_{LONG}$ in the longitudinal direction of the dispersed phase is substituted for $r_i$ in the following Equation (A), the value of the specific surface area A represented by the following Equation (A) is 2.3 or more, and when the value of ½ of the number average diameter $R_{SHORT}$ in the lateral direction of the dispersed phase is substituted for $r_i$ in the following Equation (A), the value of the specific surface area A represented by the following Equation (A) is 7.2 or more; and it is still more preferable that when the value of ½ of the number average diameter $R_{LONG}$ in the longitudinal direction of the dispersed phase is substituted for $r_i$ in the following Equation (A), the value of the specific surface area A represented by the following Equation (A) is 2.4 or more, and when the value of ½ of the number average diameter $R_{SHORT}$ in the lateral direction of the dispersed phase is substituted for $r_i$ in the following Equation (A), the value of the specific surface area A represented by the following Equation (A) is 7.4 or more.

$$A = \frac{\sum_i N \times 4\pi r_i^2}{\sum_i \frac{N \times 4\pi r_i^3}{3}} \quad (A)$$

In the Equation (A), A represents the specific surface area of the dispersed phase, N represents the number of the dispersed phase in an observation visual field, and $r_i$ represents a radius of an i-th dispersed phase.

In the Equation (A), the denominator represents the volume of the dispersed phase, and the numerator represents the surface area of the dispersed phase. Each parameter in the Equation (A) is obtained, based on the obtained image, by using the image analysis software "Image J" manufactured by National Institutes of Health of USA.

The method of setting each of the values of the specific surface area A within the above range is not particularly limited. Examples thereof include: 1) a method of increasing kneading specific energy (ESP, work amount added per unit weight); 2) a method of adjusting a viscosity of a resin composition by lowering a kneading temperature; 3) a method of adjusting weight average molecular weights of the polyethylene terephthalate resin and the polycarbonate-based resin; and 4) a method of strengthening a kneading zone in a screw configuration of a kneader.

Component of Resin Composition

The resin composition according to the present exemplary embodiment contains a polycarbonate-based resin and a polyethylene terephthalate resin. The resin composition according to the present exemplary embodiment may contain, as necessary, a glycidyl group-containing polyethylene-based copolymer, an organic phosphorus flame retardant, a flame retardant anti-dripping agent, and other components.

Polycarbonate-Based Resin

The polycarbonate-based resin refers to a resin containing at least a carbonate group (—O—(C=O)—O—) as a structural unit.

Examples of the polycarbonate-based resin include an aromatic polycarbonate, a polyorganosiloxane-containing aromatic polycarbonate, an aliphatic polycarbonate, and an alicyclic polycarbonate. Among these, the polycarbonate-based resin preferably contains the aromatic polycarbonate resin from the viewpoint of surface impact strength or the like of the resin molded article. Specific examples of the aromatic polycarbonate resin include polycarbonate resins of bisphenol A type, Z type, S type, MIBK type, AP type, TP type, biphenyl type, and hydrogenated bisphenol A type.

The polycarbonate-based resin may also be produced, for example, by reacting a dihydric phenol with a carbonate precursor.

Examples of the dihydric phenol include 2,2-bis(4-hydroxyphenyl) propane [bisphenol A], bis(4-hydroxyphenyl) methane, 1,1-bis(4-hydroxyphenyl) ethane, 2,2-bis(4-hydroxy-3,5-dimethylphenyl) propane, bis(4-hydroxyphenyl) cycloalkane, bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ether, and bis(4-hydroxyphenyl) ketone.

Examples of the carbonate precursor include a carbonyl halide, a carbonyl ester, and a haloformate. Specific examples thereof include phosgene, dihaloformate of a dihydric phenol, diphenyl carbonate, dimethyl carbonate, and diethyl carbonate.

A weight average molecular weight (Mw) of the polycarbonate-based resin is preferably, for example, 50,000 or more and 600,000 or less. When the weight average molecular weight of the polycarbonate-based resin is 50,000 or more and 600,000 or less, the surface impact strength tends to be further improved when the resin composition is made into a resin molded article.

A number average molecular weight (Mn) of the polycarbonate-based resin is more preferably, for example, 10,000 or more and 30,000 or less. When the number average molecular weight of the polycarbonate-based resin is 10,000 or more, the flowability of the resin composition tends to be prevented from being excessive and the processability of the resin molded article tends to be prevented from being deteriorated. On the other hand, when the number average molecular weight of the polycarbonate-based resin is 30,000 or less, the flowability of the resin composition tends to be prevented from being too low and the processability of the resin molded article tends to be prevented from being deteriorated.

In the resin composition according to the present exemplary embodiment, a content of the polycarbonate-based resin is preferably 40 parts by mass or more and 90 parts by mass or less, and more preferably 50 parts by mass or more and 80 parts by mass or less based on 100 parts by mass of resin components in the resin composition, from the viewpoint of further preventing the variation in measurement during the injection molding.

A concentration of terminal hydroxy groups in the polycarbonate-based resin is preferably, for example, 10 μeq/g or more and 15 μeq/g or less.

When the concentration of the terminal hydroxy groups in the polycarbonate-based resin is 10 μeq/g or more, the surface impact strength of the obtained resin molded article tends to be further improved. On the other hand, when the concentration of the terminal hydroxy groups in the polycarbonate-based resin is 15 μeq/g or less, the molding flowability of the resin composition tends to be prevented from decreasing, and the surface impact strength tends to be further improved.

The concentration of the terminal hydroxy groups in the polycarbonate-based resin indicates the number of phenolic terminal hydroxy groups present in 1 g of the polycarbonate-based resin. The concentration of the terminal hydroxy groups in the polycarbonate-based resin is measured according to a colorimetric determination by the method using titanium tetrachloride/acetic acid (the method described in Macromol. Chem. 88215 (1965)).

When the resin is not used, the concentration of the terminal hydroxy groups in the polycarbonate-based resin may be adjusted by the addition amount of a terminal blocking agent in the polymerization step. On the other hand, when the resin contains a recovered polycarbonate-based resin (hereinafter also referred to as a "recycled PC resin") recovered from the market, the concentration of the terminal hydroxy groups in the polycarbonate-based resin may vary depending on the usage state of the recycled PC resin in the market.

The polycarbonate-based resin preferably contains the recycled PC resin. The recycled PC resin is more easily to be a polycarbonate-based resin having a concentration of terminal hydroxy groups of 10 μeq/g or more and 15 μeq/g or less since the recycled PC resin is more hydrolyzed, as compared with a polycarbonate-based resin before entering the market.

For example, a content of the recycled PC resin is preferably 10 parts by mass or more and 90 parts by mass or less, and more preferably 20 parts by mass or more and 80 parts by mass or less based on 100 parts by mass of the entire polycarbonate-based resin. When the content of the recycled PC resin is 10 parts by mass or more and 90 parts by mass or less based on 100 parts by mass of the entire polycarbonate-based resin, the impact resistance tends to be improved when the resin composition is made into a resin molded article.

The recycled PC resin is used, for example, after recovering a resin molded article of the polycarbonate-based resin from the market and crushing the resin molded article using a dry or wet crusher or the like.

Polyethylene Terephthalate Resin

A weight average molecular weight of the polyethylene terephthalate resin is preferably, for example, 5,000 or more and 100,000 or less. A number average molecular weight of the polyethylene terephthalate resin is preferably, for example, 5,000 or more and 50,000 or less. When the weight average molecular weight and the number average molecular weight of the polyethylene terephthalate resin are within the above ranges, the flowability at the time of molding the resin composition does not become too high, and the processability of the resin molded article tends to be improved.

The polyethylene terephthalate resin preferably contains a recovered polyethylene terephthalate resin (hereinafter also referred to as a "recycled PET resin") recovered from the market.

For example, a content of the recycled PET resin is preferably 30 parts by mass or more, and more preferably 40 parts by mass or more based on 100 parts by mass of the entire polyethylene terephthalate resin. When the content of the recycled PET resin is within the above range, the tensile elongation at break tends to be prevented from decreasing when the resin composition is made into a resin molded article.

The recycled PET resin is used, for example, after recovering a resin molded article of the polyethylene terephthalate resin from the market and crushing the resin molded article using a dry or wet crusher or the like.

In the resin composition according to present exemplary embodiment, the content of the polyethylene terephthalate resin is preferably 10 parts by mass or more and 40 parts by mass or less, more preferably 15 parts by mass or more and 40 parts by mass or less, and still more preferably 20 parts by mass or more and 40 parts by mass or less based on 100 parts by mass of the resin components in the resin composition, from the viewpoint of further preventing the variation in measurement during the injection molding.

Glycidyl Group-Containing Polyethylene-Based Copolymer

The glycidyl group-containing polyethylene-based copolymer refers to a copolymer containing at least one of a structural unit derived from a polymerizable vinyl monomer and a structural unit derived from a (meth)acrylate containing a glycidyl group (hereinafter, also referred to as "glycidyl group-containing (meth)acrylate unit").

When the resin composition according to the present exemplary embodiment contains the glycidyl group-containing polyethylene-based copolymer, the glycidyl group-containing polyethylene-based copolymer tends to react with the polyethylene terephthalate resin forming a dispersed phase, and the obtained reaction product tends to be a dispersed phase. Since the dispersed phase containing this reaction product has a molecular weight higher than that of the dispersed phase containing only the polyethylene terephthalate resin, the difference in viscosity between the continuous phase and the dispersed phase during the injection molding may be easily prevented to a smaller level. As a result, the variation in measurement during the injection molding tends to be further prevented.

In addition, the glycidyl group-containing polyethylene-based copolymer easily functions as an elastomer having rubber-like elasticity by cooling or the like. Therefore, when a resin composition containing the glycidyl group-containing polyethylene-based copolymer is used, the surface impact strength tends to improve when the resin composition is made into a resin molded article.

Examples of the polymerizable vinyl monomer include ethylene, ester-based vinyl, aromatic vinyl, and vinyl cyanide.

Examples of the ester-based vinyl include methyl (meth)acrylate, ethyl (meth)acrylate, butyl (meth)acrylate, isobutyl (meth)acrylate, and 2-ethylhexyl (meth)acrylate.

Examples of the aromatic vinyl include styrene and vinylnaphthalene.

Examples of the vinyl cyanide include acrylonitrile, α-chloroacrylonitrile, and methacrylonitrile.

Examples of the glycidyl group-containing (meth)acrylate unit include glycidyl (meth)acrylate, vinyl glycidyl ether, (meth)acrylic glycidyl ether, 2-methylpropenyl glycidyl ether, styrene-p-glycidyl ether, glycidyl cinnamate, itaconic acid glycidyl ester, and N-[4-(2,3-epoxypropoxy)-3,5-dimethylbenzyl] methacrylamide.

In the present description, "(meth)acrylic" means at least one of acrylic and methacrylic. In the present description, "(meth)acrylate" means at least one of acrylate and methacrylate.

A content of the glycidyl group-containing (meth)acrylate unit is preferably 2 mass % or more and 20 mass % or less based on all structural units constituting the glycidyl group-containing polyethylene-based copolymer.

When the content of the glycidyl group-containing (meth)acrylate unit is 2 mass % or more, the dispersed phase tends to have a high molecular weight by reacting with the polyethylene terephthalate resin. On the other hand, when the content of the glycidyl group-containing (meth)acrylate unit is 20 mass % or less, it is considered that the flowability of the resin composition is prevented from decreasing, and the processability of the resin molded article containing the resin composition is also prevented from decreasing.

The glass transition temperature of the glycidyl group-containing polyethylene-based copolymer is preferably 0° C. or lower. When the glass transition temperature is within the above range, the elasticity tends to be prevented from decreasing when the resin composition is made into a resin molded article.

The glass transition temperature of the glycidyl group-containing polyethylene-based copolymer is an intermediate value (Tgm) of two shoulder values obtained by a tangential method from a peak derived from the glass transition temperature by measuring a calorific spectrum by using a differential calorimeter (differential scanning calorimetryDSC-60, manufactured by Shimadzu Corporation) at a temperature raising rate of 10° C. per minute.

The glycidyl group-containing polyethylene-based copolymer may be any of a random copolymer, an alternating copolymer, a graft copolymer and the like.

As one exemplary embodiment, the glycidyl group-containing polyethylene-based copolymer may be, for example, a copolymer obtained by graft-polymerizing a structural unit derived from a polymerizable vinyl monomer to the main chain formed by polymerizing structural units derived from a (meth)acrylate containing a glycidyl group.

Examples of the method for producing the glycidyl group-containing polyethylene-based copolymer include a method of living-polymerizing a polymerizable vinyl monomer and a monomer constituting the glycidyl group-containing (meth)acrylate unit. Examples of the living polymerization method include: a method of performing anionic polymerization in the presence of a mineral acid salt such as an alkali metal salt or an alkaline earth metal salt using an organic alkali metal compound as a polymerization initiator; a method of performing anionic polymerization in the presence of an organic aluminum compound using an organic alkali metal compound as a polymerization initiator; a method of performing polymerization using an organic rare earth metal complex as a polymerization initiator; and a method of performing radical polymerization in the presence of a copper compound using an α-halogenated ester compound as an initiator.

For example, when the glycidyl group-containing polyethylene-based copolymer is the graft copolymer described above, as the method for producing the glycidyl group-containing polyethylene-based copolymer, in addition to the living polymerization described above, a method of performing one-stage or multi-stage polymerization by radical polymerization may be applied.

A weight average molecular weight of the glycidyl group-containing polyethylene-based copolymer is preferably, for example, 3,000 or more and 100,000 or less. When the weight average molecular weight of the glycidyl group-containing polyethylene-based copolymer is less than 3,000, the impact resistance may decrease when the resin composition is made into a resin molded article, as compared with the case where the above range is satisfied. When the weight average molecular weight of the glycidyl group-containing polyethylene-based copolymer is more than 100,000, the dispersibility in the resin composition may decrease as compared with the case where the above range is satisfied.

A content of the glycidyl group-containing polyethylene-based copolymer is preferably 1 part by mass or more and 10 parts by mass or less, and more preferably 3 parts by mass or more and 8 parts by mass or less based on 100 parts by mass of the resin components in the resin composition, from the viewpoint of further preventing the variation in measurement during the injection molding.

Organic Phosphorus Flame Retardant

The organic phosphorus flame retardant refers to an organic phosphorus compound containing a carbon-phosphorus bond and having flame retardancy. The organic phosphorus flame retardant tends to be dispersed in the continuous phase. Therefore, when the resin composition according to the present exemplary embodiment contains the organic phosphorus flame retardant, during the molding, the viscosity of the continuous phase is lowered, the viscosity of the continuous phase easily approaches the viscosity of the dispersed phase, and the variation in measurement during injection molding tends to be further prevented. In addition, when the resin composition contains the organic phosphorus flame retardant, the resin composition tends to have flame retardancy.

Examples of the organic phosphorus flame retardant include an aromatic phosphate, a condensed phosphate, a phosphinate salt, and a polyphosphate having a triazine skeleton. Among these, the organic phosphorus flame retardant preferably contains a condensed phosphate, and more preferably contains an aromatic condensed phosphate.

The organic phosphorus flame retardant may be a synthetic product or a commercially available product. Examples of the commercially available product of the organic phosphorus flame retardant include "CR-741" manufactured by Daihachi Chemical Industry Co., Ltd., "AP422" manufactured by Clariant International Ltd., and "Nova Excel 140" manufactured by RIN KAGAKU KOGYO Co., Ltd.

In the resin composition according to the present exemplary embodiment, a content of the organic phosphorus flame retardant is preferably 1 part by mass or more and 25 parts by mass or less, and more preferably 10 parts by mass or more and 20 parts by mass or less based on 100 parts by mass of the resin components, from the viewpoint of further preventing the variation in measurement during the injection molding.

Flame Retardant Anti-Dripping Agent

The flame retardant anti-dripping agent refers to a material for preventing drip (dripping) and enhancing flame retardancy when heating the resin composition. The flame retardant anti-dripping agent tends to be dispersed in each of the continuous phase and the dispersed phase. Therefore, when the resin composition according to the present exemplary embodiment contains the flame retardant anti-dripping agent, during the molding, the dispersed phase is easily present in the continuous phase with high dispersibility. As a result, an increase in the size of the dispersed phase during the molding tends to be more easily prevented, and the variation in measurement during the injection molding tends to be further prevented. In addition, when the resin composition contains the flame retardant anti-dripping agent, the resin composition tends to have flame retardancy.

Examples of the flame retardant anti-dripping agent include a glass fiber, a liquid crystal polymer, and a fluorine-containing resin. Among these, the flame retardant anti-dripping agent preferably contains a fluorine-containing resin.

Examples of the fluorine-containing resin include polytetrafluoroethylene (PTFE), polyvinylidene fluoride, and polyhexafluoropropylene. Among these, the fluorine-containing resin preferably contains polytetrafluoroethylene (PTFE).

In the resin composition according to the present exemplary embodiment, a content of the flame retardant anti-dripping agent is preferably 0.2 part by mass or more and 1.0 part by mass or less, and more preferably 0.3 part by mass or more and 0.8 part by mass or less based on 100 parts by mass of the resin components, from the viewpoint of further preventing the variation in measurement during the injection molding.

Other Components

The resin composition according to present exemplary embodiment may contain other components (hereinafter, simply referred to as "other components") in addition to the polycarbonate-based resin, the polyethylene terephthalate resin, the glycidyl group-containing polyethylene-based copolymer, the organic phosphorus flame retardant, and the flame retardant anti-dripping agent within a range where the variation in measurement during the injection molding is prevented.

Examples of the other components include a methyl methacrylate-butadiene-styrene copolymer (MBS copolymer), resins other than the polyethylene terephthalate resin and the glycidyl group-containing polyethylene-based copolymer, an anti-hydrolysis agent, an antioxidant, and a filler.

The content of the other components is not particularly limited as long as it is within a range where the variation in measurement during the injection molding is prevented, and is preferably, for example, 0.01 mass % or more and 0.5 mass % or less, and more preferably 0.1 mass % or more and 0.3 mass % or less based on the total amount of the resin components constituting the resin composition.

Examples of the anti-hydrolysis agent include a carbodiimide compound and an oxazoline compound. Examples of the carbodiimide compound include dicyclohexylcarbodiimide, diisopropylcarbodiimide, dimethylcarbodiimide, diisobutylcarbodiimide, dioctyl carbodiimide, diphenylcarbodiimide, and naphthylcarbodiimide.

Examples of the antioxidant include phenol-based, amine-based, phosphorus-based, sulfur-based, hydroquinone-based, and quinoline-based antioxidants.

Examples of the filler include kaolin, bentonite, clay such as kibushi clay and gairome clay, talc, mica, and montmorillonite.

Method for Preparation of Resin Composition

A method for preparation of the resin composition according to the exemplary embodiment is preferably a method of melt kneading.

The method of melt-kneading the material is not particularly limited, and well-known melt-kneaders such as a twin-screw extruder or a single-screw extruder may be applied as the melt-kneader.

The melt-kneading temperature may be appropriately designed according to the type of the resin used, the composition ratio, or the like. For example, the barrel (cylinder) temperature is preferably in the range of 220° C. or higher and 280° C. or lower, and the die temperature is preferably in the range of 220° C. or higher and 280° C. or lower.

The melt-kneading time may be appropriately designed according to the charged amount of the raw material or the like. For example, when a twin-screw extruder is used as the melt-kneader, the average residence time is preferably 10 minutes or shorter.

Resin Molded Article

The resin molded article according to the present exemplary embodiment contains the resin composition according to the present exemplary embodiment.

Since the resin molded article according to the present exemplary embodiment has the above configuration, the variations in measurement during the injection molding are prevented. Therefore, the volume of the resin discharged for each molding shot tends to be prevented from varying. As a result, the variation in weight and dimension of the resin molded article is prevented.

The resin molded article according to the present exemplary embodiment may be obtained by, for example, molding the resin composition according to the present exemplary embodiment described above by a molding method such as injection molding, extrusion molding, blow molding, or hot press molding.

The resin molded article according to the present exemplary embodiment is preferably an injection molded article from the viewpoint of preventing the variation in weight and dimension.

The injection molding may be performed using a commercially available device such as "NEX150" manufactured by NISSEI PLASTIC INDUSTRIAL CO., LTD., "NEX70000" manufactured by NISSEI PLASTIC INDUSTRIAL CO., LTD., and "SE50D" manufactured by Toshiba Machine Co., Ltd. At this time, the cylinder temperature is preferably, for example, 170° C. or higher and 280° C. or lower. The mold temperature is preferably, for example, 30° C. or higher and 120° C. or lower from the viewpoint of productivity.

Use

The resin molded article according to the present exemplary embodiment is suitably used for parts such as precision instruments that require a small dimensional change rate. The resin molded article according to the present exemplary embodiment is used for, for example, housings of home electric appliances and electronic/electrical equipment; interior materials for automobiles; various parts; wrapping films; packaging materials for CD-ROM and DVD; food and beverage packaging materials such as tableware, food trays and beverage bottles; and chemical wrap materials.

EXAMPLES

Hereinafter, the present invention will be described in more detail based on Examples, but the present invention is not limited to the following Examples. Materials, used amounts, ratios, processing procedures, and the like shown in the following Examples may be appropriately changed without departing from the spirit of the present disclosure.

The term "part" refers to "part by mass" unless otherwise specified.

Preparation of Material

The following materials are prepared.

Polycarbonate-Based Resin

The polycarbonate-based resin used in Examples and Comparative Examples is a recycled PC resin derived from a beverage bottle.

Polyethylene Terephthalate Resin

The polyethylene terephthalate resin used in Examples or Comparative Examples is a recycled PET resin derived from a beverage bottle made of polyethylene terephthalate.

Other Resins

Glycidyl Group-Containing Polyethylene-Based Copolymer

AX8900, manufactured by ARKEMA

Glycidyl methacrylate/ethylene/methyl acrylate copolymer (composition ratio in mass %: 8/68/24), glass phase transition point (Tg): −33° C.

Methyl Methacrylate-Butadiene-Styrene Copolymer (MBS Copolymer)

C-223A, manufactured by Mitsubishi Chemical Corporation [0085]

Organic Phosphorus Flame Retardant

Aromatic Condensed Phosphate

CR-741, manufactured by Daihachi Chemical Industry Co., Ltd., phosphorus content: 9%

Ammonium Polyphosphate

AP422, manufactured by Clariant International Ltd.

Flame Retardant Anti-Dripping Agent

Flame Retardant Anti-Dripping Agent 1

FX500H, manufactured by Daikin Industries, Ltd., polytetrafluoroethylene content: 100%

Antioxidant

Antioxidant 1

Irganox 1076 manufactured by BASF Corporation, Phenol based antioxidant

Table 1 shows the weight average molecular weight (Mw), the number average molecular weight (Mn), Mw/Mn, and the concentration of terminal hydroxy groups of the polycarbonate-based resin, which are obtained by the measurement methods described above.

TABLE 1

| Resin | Mw | Mn | Mw/Mn | Concentration of terminal hydroxy groups [μeq/g] |
|---|---|---|---|---|
| Polycarbonate-based resin | 58500 | 19400 | 3.02 | 12 |

Preparation of Resin Composition

Examples 1 to 8 and Comparative Examples 1 to 3

The polycarbonate-based resin, the polyethylene terephthalate resin, the flame retardant anti-dripping agent, the organic phosphorus flame retardant, and the antioxidant as needed having the types and amounts shown in Table 2 are mixed in a tumbler. Thereafter, in a twin-screw extruder with a vent (TEX-30a manufactured by the Japan Steel Works, LTD., L/D=49), the barrel (cylinder) temperature is set to the temperature (kneading temperature) shown in Table 2, and the die temperature is set to the temperature (die temperature) shown in Table 2. The screw having three kneading zones is used. Then, the resin composition of each example is melt-kneaded under the conditions of a kneading specific energy (ESP value, work amount added per unit weight)

shown in Table 2, a screw rotation speed of 240 rpm, a vent suction degree of 100 MPa, and a discharge rate of 10 kg/h.

The barrel of the twin-screw extruder with a vent is divided into 14 segments in the longitudinal direction (direction that raw material is extruded). The amount of the organic phosphorus flame retardant shown in Table 2 is added to the melt-kneading system from a charging port provided on the eighth segment of the barrel. Subsequently, the resin discharged from the twin-screw extruder is cut into pellet shapes.

Preparation of Resin Molded Article

The obtained pellet-shaped resin composition is dried at 90° C. for 4 hours using a hot air dryer, and is then injection-molded by using an injection molding machine ("NEX500", manufactured by Toshiba Machine Co., Ltd.) at a cylinder temperature of 260° C. and a mold temperature of 60° C., to obtain the resin molded article (evaluation test piece) of each example.

A center portion in the cross-sectional direction of the resin molded article of each example is cut into 1 mm square. The polyethylene terephthalate resin in the resin molded article is dyed with ruthenium tetroxide. Thereafter, the resin molded article is cut by using an ultramicrotome at −196° C. to make an ultrathin section of 0.1 μm or less (about 80 nm), and the ultrathin section is observed with a transmission electron microscope (JEM-2100 manufactured by JEOL Ltd.) under a magnification of 35,000 times. As a result, it is confirmed that each resin molded article forms a phase-separated structure (sea-island structure) including a continuous phase containing a polycarbonate-based resin and a dispersed phase containing a polyethylene terephthalate resin.

Table 2 shows the number average diameter in the longitudinal direction of the dispersed phase, the number average diameter in the lateral direction of the dispersed phase, the aspect ratio, and the value of the specific surface area A in the Equation (A), which are obtained by the above-described measurement methods. The value of the specific surface area A in the Equation (A) is obtained, based on the image obtained by the transmission electron microscope, by using the image analysis software "Image J" manufactured by National Institutes of Health of USA.

Evaluation and Test

The following evaluations and tests are performed on the resin composition of each example. Table 2 shows each result.

Evaluation on Measurement Stability

In the preparation of the resin molded article using the resin composition of each example, a flat plate (300 mm×200 mm, thickness 1.8 mm) is injection-molded and the measurement time is measured. Molding is performed for 30 shots, and the average measurement time (arithmetic mean value), the standard deviation, and the variation (calculated by dividing (standard deviation×3) by average measurement time) are obtained.

Tensile Strength and Tensile Elongation at Break

An injection molded article as a JIS No. 1 test piece (thickness: 4 mm) is obtained by injection molding from the resin composition of each example. The tensile strength and tensile elongation at break of the obtained injection molded article are measured according to JIS K-7113.

The larger the value of tensile strength, the better the tensile strength.

The larger the value of tensile elongation at break, the better the tensile elongation at break.

Charpy Impact Resistance Strength

For an ISO multipurpose dumbbell test piece of the resin molded article of each example that is subjected to a notch processing, the Charpy impact resistance strength (unit: $kJ/m^2$) is measured in the MD direction by a digital impact tester (DG-5 manufactured by Toyo Seiki Co., Ltd.) according to ISO-179. The measurement conditions are a lifting angle of 150 degrees, a hammer used of 2.0 J, and the number of measurements n=10.

The larger the value of the Charpy impact resistance strength, the better the impact resistance.

TABLE 2

| | Composition | | Example 1 | Example 2 | Comparative Example 1 | Comparative Example 2 | Comparative Example 3 | Example 3 | Example 4 | Example 5 | Example 6 | Example 7 | Example 8 |
|---|---|---|---|---|---|---|---|---|---|---|---|---|---|
| Resin composition | Polycarbonate-based resin | | 63 | 63 | 63 | 63 | 63 | 63 | 63 | 63 | 63 | 91 | 59 |
| | Polyethylene terephthalate resin | | 37 | 37 | 37 | 37 | 37 | 37 | 37 | 37 | 37 | 9 | 41 |
| | Glycidyl group-containing polyethylene-based copolymer | | 5 | 0 | 5 | 5 | 0 | 5 | 0 | 0 | 0 | 0 | 0 |
| | MBS copolymer | | 0 | 5 | 0 | 0 | 0 | 0 | 0 | 0 | 0 | 0 | 0 |
| | Organic phosphorus flame retardant | Aromatic condensed phosphate | 15 | 15 | 15 | 15 | 0 | 0 | 15 | 26 | 15 | 15 | 15 |
| | | Ammonium polyphosphate | 0 | 0 | 0 | 0 | 0 | 15 | 0 | 0 | 0 | 0 | 0 |
| | Flame retardant anti-dripping agent | PTFE | 0.5 | 0.5 | 0.5 | 0.5 | 0 | 0.5 | 0.5 | 0.5 | 0.9 | 0.5 | 0.5 |
| | Antioxidant | | 0.2 | 0.2 | 0.2 | 0.2 | 0 | 0.2 | 0.2 | 0.2 | 0.2 | 0.2 | 0.2 |
| Content of | Content (part by mass) of organic phosphorus | | 14 | 14 | 14 | 14 | 0 | 14 | 15 | 26 | 15 | 15 | 15 |

TABLE 2-continued

| | Composition | Example 1 | Example 2 | Comparative Example 1 | Comparative Example 2 | Comparative Example 3 | Example 3 | Example 4 | Example 5 | Example 6 | Example 7 | Example 8 |
|---|---|---|---|---|---|---|---|---|---|---|---|---|
| material based on 100 parts by mass of resin components | flame retardant Content (part by mass) of flame retardant anti-dripping agent | 0.5 | 0.5 | 0.5 | 0.5 | 0.0 | 0.5 | 0.5 | 0.5 | 0.9 | 0.5 | 0.5 |
| | Content (part by mass) of polycarbonate-based resin | 60 | 60 | 60 | 60 | 63 | 60 | 63 | 63 | 63 | 91 | 59 |
| | Content (part by mass) of polyethylene terephthalate resin | 35 | 35 | 35 | 35 | 37 | 35 | 37 | 37 | 37 | 9 | 41 |
| Molding condition | Kneading temperature | 250 | 250 | 260 | 270 | 250 | 250 | 250 | 250 | 250 | 250 | 250 |
| | Die temperature | 250 | 250 | 260 | 270 | 250 | 250 | 250 | 250 | 250 | 250 | 250 |
| | EPS (kWh/kg) | 0.16 | 0.15 | 0.12 | 0.11 | 0.26 | 0.21 | 0.15 | 0.07 | 0.14 | 0.25 | 0.14 |
| Resin phase-separated structure | Number average diameter (μm) in longitudinal direction | 0.90 | 1.40 | 1.62 | 1.92 | 2.96 | 1.45 | 1.40 | 0.88 | 1.38 | 1.50 | 1.48 |
| | Number average diameter (μm) in lateral direction | 0.41 | 0.61 | 0.53 | 0.57 | 0.86 | 0.59 | 0.60 | 0.38 | 0.56 | 0.61 | 0.61 |
| | Aspect ratio | 2.2 | 2.3 | 3.0 | 3.4 | 3.4 | 2.5 | 2.3 | 2.3 | 2.5 | 2.5 | 2.4 |
| | Specific surface area A in longitudinal direction | 2.70 | 2.24 | 0.77 | 0.63 | 0.52 | 2.03 | 2.23 | 2.68 | 0.83 | 0.61 | 0.81 |
| | Specific surface area A in lateral direction | 7.85 | 7.12 | 5.69 | 4.87 | 3.44 | 7.01 | 7.13 | 7.75 | 5.88 | 4.52 | 5.96 |
| Measurement stability | Average measurement time (s) | 10.81 | 11.02 | 13.68 | 14.89 | 25.41 | 11.5 | 11.01 | 12.42 | 13.26 | 13.34 | 13.51 |
| | Standard deviation (s) | 0.07 | 0.11 | 0.41 | 1.10 | 8.56 | 0.12 | 0.11 | 0.25 | 0.39 | 0.38 | 0.36 |
| | Variation (%) | 2.1 | 3.0 | 9.0 | 22.1 | 101.1 | 3.1 | 3.0 | 6.0 | 8.8 | 8.5 | 8.0 |
| Mechanical property | Tensile strength (MPa) | 62 | 61 | 60 | 59 | 55 | 63 | 57 | 63 | 58 | 55 | 62 |
| | Tensile elongation at break (%) | 45 | 42 | 35 | 28 | 3 | 10 | 8 | 42 | 6 | 7 | 10 |
| | Charpy impact resistance strength (kJ/m$^2$) | 25 | 22 | 19 | 18 | 3 | 8 | 5 | 3 | 4 | 4 | 2 |

As shown in Table 2, it is seen that the resin molded article containing the resin composition of Examples has a smaller variation in measurement during the injection molding than the resin molded article containing the resin composition of Comparative Examples. It is also seen that the resin molded article containing the resin composition of Examples is superior in tensile strength, tensile elongation at break, and Charpy impact resistance strength as compared with the resin molded article containing the resin composition of Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition, comprising:
   a resin component comprising:
      a polycarbonate-based resin; and
      a polyethylene terephthalate resin;
   an organic phosphorus flame retardant; and
   a flame retardant anti-dripping agent,
   the resin composition having:
      a resin phase-separated structure including a continuous phase containing the polycarbonate-based resin and a dispersed phase containing the polyethylene terephthalate resin,
   wherein:
      a number average diameter in a longitudinal direction of the dispersed phase is 1.5 μm or less,
      a number average diameter in a lateral direction of the dispersed phase is 0.8 μm or less,
      an aspect ratio of the number average diameter in the longitudinal direction to the number average diameter in the lateral direction is 2.5 or less, and
      a content of the flame retardant anti-dripping agent is 0.3 part by mass or more and 0.8 part by mass or less based on 100 parts by mass of the resin component.

2. The resin composition according to claim 1, wherein the number average diameter in the longitudinal direction of the dispersed phase is 0.5 μm or more and 1.3 μm or less.

3. The resin composition according to claim 1, wherein the number average diameter in the lateral direction of the dispersed phase is 0.1 μm or more and 0.6 μm or less.

4. The resin composition according to claim 1, wherein the organic phosphorus flame retardant contains a condensed phosphate.

5. The resin composition according to claim 2, wherein the organic phosphorus flame retardant contains a condensed phosphate.

6. The resin composition according to claim 3, wherein the organic phosphorus flame retardant contains a condensed phosphate.

7. The resin composition according to claim 1, wherein the flame retardant anti-dripping agent contains a fluorine-containing resin.

8. The resin composition according to claim 2, wherein the flame retardant anti-dripping agent contains a fluorine-containing resin.

9. The resin composition according to claim 3, wherein the flame retardant anti-dripping agent contains a fluorine-containing resin.

10. The resin composition according to claim 7, wherein the fluorine-containing resin contains polytetrafluoroethylene (PTFE).

11. The resin composition according to claim 1, wherein a content of the organic phosphorus flame retardant is 1 part by mass or more and 25 parts by mass or less based on 100 parts by mass of the resin component.

12. The resin composition according to claim 1, wherein a content of the polycarbonate-based resin is 40 parts by mass or more and 90 parts by mass or less based on 100 parts by mass of the resin component.

13. The resin composition according to claim 1, wherein a content of the polyethylene terephthalate resin is 10 parts by mass or more and 40 parts by mass or less based on 100 parts by mass of the resin component.

14. The resin composition according to claim 1, wherein
when a value of ½ of the number average diameter $R_{LONG}$ in the longitudinal direction of the dispersed phase is substituted for $r_i$ in the following Equation (A), a value of a specific surface area A represented by the following Equation (A) is 2.0 or more, and
when a value of ½ of the number average diameter $R_{SHORT}$ in the lateral direction of the dispersed phase is substituted for $r_i$ in the following Equation (A), the value of the specific surface area A represented by the following Equation (A) is 7.0 or more, $$A = \frac{\sum_i N \times 4\pi r_i^2}{\sum_i \frac{N \times 4\pi r_i^3}{3}} \qquad (A)$$

[in the Equation (A), A represents the specific surface area of the dispersed phase, N represents the number of the dispersed phase in an observation visual field, and $r_i$ represents a radius of an i-th dispersed phase].

15. A resin molded article comprising: the resin composition according to claim 1.

16. The resin molded article according to claim 13, which is an injection molded article.

17. The resin composition according to claim 1, wherein the resin component further comprises a glycidyl group-containing polyethylene-based copolymer.

18. The resin composition according to claim 1, wherein the resin component further comprises a methyl methacrylate-butadiene-styrene copolymer.

19. The resin composition according to claim 1, wherein the resin component consists of the polycarbonate-based resin and the polyethylene terephthalate resin.

* * * * *